(12) United States Patent
Matsuura (10) Patent No.: US 7,697,781 B2
(45) Date of Patent: Apr. 13, 2010

(54) IMAGE PROCESSING METHOD AND APPARATUS

(75) Inventor: Takahiro Matsuura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/259,052

(22) Filed: Oct. 27, 2005

(65) Prior Publication Data

US 2006/0093211 A1 May 4, 2006

(30) Foreign Application Priority Data

Oct. 28, 2004 (JP) ............................. 2004-314720

(51) Int. Cl.
G06K 9/40 (2006.01)
G06K 9/00 (2006.01)
G03F 3/08 (2006.01)
(52) U.S. Cl. .................. 382/274; 382/162; 358/518
(58) Field of Classification Search ........... 382/162, 382/274; 358/518
See application file for complete search history.

(56) References Cited

U.S. PATENT DOCUMENTS

| 5,416,890 | A | * | 5/1995 | Beretta | 345/590 |
| 5,627,950 | A | * | 5/1997 | Stokes | 345/591 |
| 5,805,213 | A | * | 9/1998 | Spaulding et al. | 348/222.1 |
| 6,058,207 | A | * | 5/2000 | Tuijn et al. | 382/162 |
| 6,437,792 | B1 | * | 8/2002 | Ito et al. | 345/600 |
| 6,823,090 | B2 | | 11/2004 | Matsuura | 382/275 |
| 7,013,042 | B1 | | 3/2006 | Yamada et al. | 382/167 |
| 2003/0048464 | A1 | * | 3/2003 | Yamada et al. | 358/1.9 |
| 2003/0161530 | A1 | | 8/2003 | Yamada et al. | 382/167 |
| 2003/0184557 | A1 | * | 10/2003 | Wen | 345/590 |
| 2004/0151370 | A1 | | 8/2004 | Sasaki | 382/162 |
| 2005/0036707 | A1 | | 2/2005 | Matsuura | 382/275 |
| 2006/0093211 | A1 | | 5/2006 | Matsuura | 382/162 |
| 2006/0204084 | A1 | | 9/2006 | Matsuura | 382/162 |
| 2007/0058223 | A1 | | 3/2007 | Matsuura | 358/518 |

FOREIGN PATENT DOCUMENTS

| JP | 2001-111852 | | 4/2001 |
| JP | 2004-153684 | A | 5/2004 |
| JP | 2004153684 | A * | 5/2004 |
| JP | 2004-254303 | | 9/2004 |

* cited by examiner

*Primary Examiner*—Samir A. Ahmed
*Assistant Examiner*—Li Liu
(74) *Attorney, Agent, or Firm*—Fitzpatrick, Cella, Harper & Scinto (57) ABSTRACT

An image obtained by being imaged by an imaging device and converted to color data using a color processing parameter is input and target color data corresponding to converted color data is input. Next, the color processing parameter is optimized based upon the color difference between the converted color data and target color data. When the optimization processing is executed, first optimization processing is executed for optimizing the color processing parameter using the first target color data being within a prescribed color gamut, and the converted color data corresponding to the target color data, and second optimization processing is executed for optimizing the color processing parameter using second target color data, which includes the target color data being out of the prescribed color gamut and is less than a prescribed threshold value, and the converted color data corresponding to the second target color data.

8 Claims, 6 Drawing Sheets

IMAGE PROCESSING METHOD AND APPARATUS

FIELD OF THE INVENTION

The present invention relates to an image processing method and apparatus for generating a color processing table used in color processing of an image obtained by imaging performed by an imaging device.

BACKGROUND OF THE INVENTION

In a conventional imaging device such as a digital camera, a plurality of color processing parameters are stored within the image device in advance, one color processing parameter is selected from among these in accordance with the particular mode and image data obtained by imaging is subjected to color processing using the color processing parameter than conforms to the mode selected. The color processing parameter referred to here is data in a case where a condition (an output condition) that is to prevail at output of output data is specified for the input data by a program or the like.

In a conventional imaging device such as a digital camera, however, only the color processing parameters of modes that have been prepared beforehand can be set. In other words, color reproduction in line with user preferences cannot be realized in accordance with the image obtained by imaging.

Accordingly, the applicant has proposed a color processing parameter customizing apparatus [see the specification of Japanese Patent Application Laid-Open No. 2004-153684 (Patent Reference 1)] for the purpose of providing an apparatus in which the color reproduction of a digital camera can be set freely based upon user preference. The apparatus of Patent Reference 1 is adapted to find an optimum color processing parameter whereby photographic data obtained when a color chart that includes skin-tone color, the colors of sky and grass or the primary colors has been photographed by a digital camera is processed in such a manner that the original colors of the color chart or the skin-tone color and colors of sky and grass or colors such as the primary colors will approach a color (referred to as "target data" below) that the user deems to be desirable.

However, there is room for improvement with regard to the apparatus set forth in Patent Reference 1, as will be set forth below.

If the target data falls within the final target color space (e.g., sRGB, AdobeRGB, etc.), comparatively good color reproduction is obtained. However, if the target data is outside the target color space, there are instances where the image quality of color reproduction in the target color space will decline owing to the effect of the target that is outside the target color space. If the target data is outside the target color space, color reproduction of the target data per se cannot be achieved. Furthermore, if the target data is outside this color space, there are instances where the input data itself departs from the target (this is particularly true with regard to hue). If optimization is performed as is, data within this color space will also deviate together with the input data.

Thus, in a system in which a three-dimensional look-up table (3D LUT) is designed fully automatically, for example, it is difficult to realize good color reproduction.

SUMMARY OF THE INVENTION

Accordingly, an object of the present invention is to provide an image processing method and apparatus in which even if optimization is performed fully automatically, highly precise color reproduction can be achieved with little color shift in a final image after color conversion.

According to the present invention, the foregoing object is attained by providing an image processing method for optimizing a color processing parameter used in color processing of an image, comprising: a converting step of converting input color data to converted color data using the color processing parameter; a target color data input step of inputting target color data corresponding to the converted color data; and an optimizing step of optimizing the color processing parameter based upon a color difference between the converted color data and the target color data; wherein the optimizing step includes: a first optimizing step of optimizing the color processing parameter using the first target color data being within a prescribed color gamut, and the converted color data corresponding to the target color data; and a second optimizing step of adopting the color processing parameter, which has been optimized by the first optimizing step, as an initial value and optimizing the color processing parameter using the second target color data, which includes the target color data being out of the prescribed color gamut, and the converted color data corresponding to the second target color data.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

DETAILED DESCRIPTION OF THE PREFERRED EMBODIMENTS

Reference will now be had to the drawings to describe in detail an image processing system for setting the color processing parameters of a 3D LUT, etc., in an embodiment of the present invention.

First Embodiment

Figure 1:
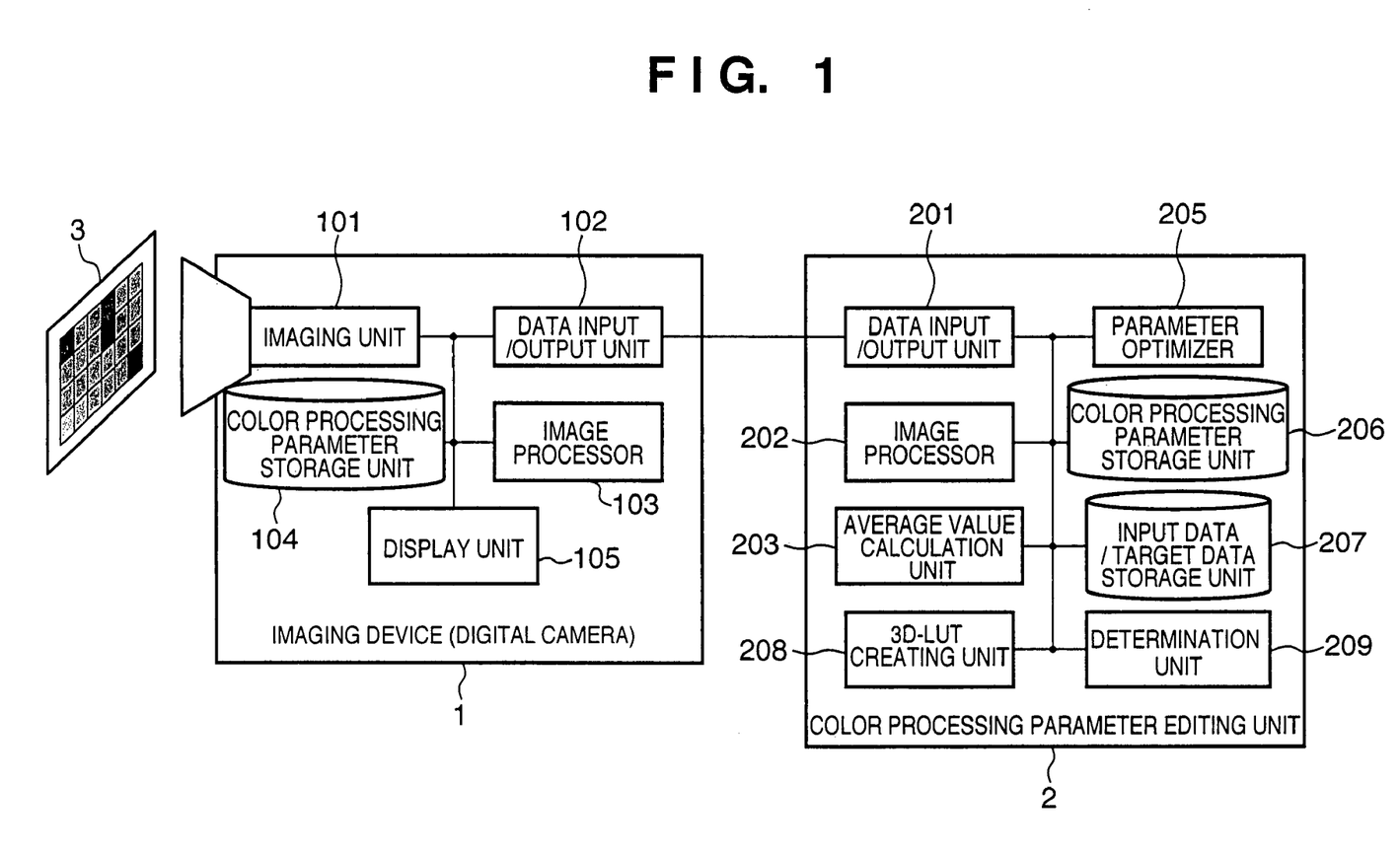
FIG. 1 is a block diagram illustrating the configuration of an image processing system according to a first embodiment of the present invention.

FIG. 1 is a block diagram illustrating the configuration of an image processing system according to a first embodiment of the present invention. As shown in FIG. 1, the system includes an imaging device (digital camera) 1, a color correction parameter customizing unit (color processing parameter editing unit) 2 and a color chart 3 that is imaged by the digital camera 1.

The digital camera 1 includes an imaging unit 101, which has an imaging lens and an image sensor such as a CCD, for imaging the color chart 3; a data input/output unit 102 serving as an interface for performing an exchange of image data obtained by imaging and various data such as color processing parameters between the color processing parameter editing unit 2 and an external unit; an image processor 103 for forming image data by subjecting the image of a subject that has been imaged by the imaging unit 101 to processing using a color processing parameter stored in a color processing parameter storage unit 104; the color processing parameter storage unit 104 for storing color processing parameters; and a display unit 105 such as a liquid crystal display for displaying images and the like during shooting.

The color processing parameter editing unit 2 includes a data input/output unit 201 serving as an interface for performing an exchange of image data, color processing parameters and target data between the imaging device 1 and the external unit; and an image processor 202 for forming image data by subjecting the image of the subject, which has been imaged by the imaging unit 101 and input from the data input/output unit 201, to processing using a color processing parameter that has been stored in a color processing parameter storage unit 206.

The color processing parameter editing unit 2 further includes an average value calculation unit 203 for calculating an RGB average of each patch of image data that has entered from the data input/output unit 201, and a parameter optimizer 205 for optimizing the color processing parameters, which have been stored in the color processing parameter storage unit 206, using the DLS method, by way of example.

The color processing parameter editing unit 2 further includes the color processing parameter storage unit 206 for storing color processing parameters of the imaging device 1 such as the digital camera; an input data/target data storage unit 207 for holding input data and target data; and a 3D-LUT creating unit 208 for creating a 3D LUT using color processing parameters that have been stored in the input data/target data storage unit 207.

The color processing parameter editing unit 2 further includes a determination unit 209 for determining whether target data is within a predetermined prescribed region (e.g., sRGB, AdobeRGB, etc.), and for calculating the color difference between input data and target data and determining whether it will be used as data when optimization is performed.

[Processing by Imaging Device (Digital Camera) 1]

First, in photography using the imaging device 1, the user closes a power switch (not shown), after which an image is acquired through the imaging unit 101. Accordingly, the image processor 103 generates a display image by applying processing to an image acquired using a parameter that has been stored in the color processing parameter storage unit 104, and displays this image on the display unit 105. The user observes the image displayed on the display unit 105, decides the composition of the picture and presses a shutter button (not shown) to take the picture.

If the shutter button is pressed, the image processor 103 subjects the image data that has been acquired by the imaging unit 101 to color or brightness processing, etc. using a parameter that has been stored in the color processing parameter storage unit 104, and outputs the processed image data through the data input/output unit 102. At this time the data may be output directly to the color processing parameter editing unit 2 using a cable or the like or to a recording medium (storage medium) such as Compact Flash (registered trademark).

Further, at this time a parameter that will output the image data, which has been acquired from the imaging unit 101, to the data input/output unit 102 as is set in the color processing parameter storage unit 104, whereby the image data that has been acquired through the imaging unit 101 can be input to the color processing parameter editing unit 2 as is.

[Color Chart 3]

Figure 2:
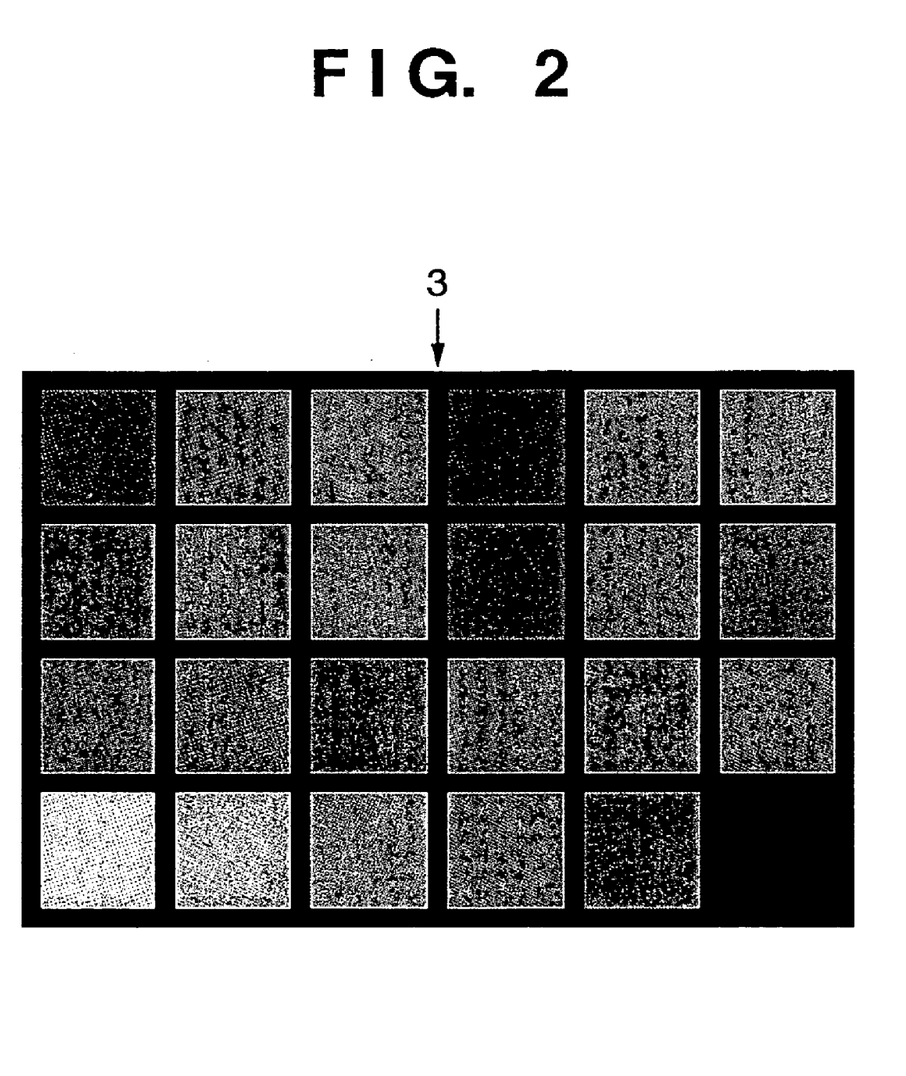
FIG. 2 is a diagram illustrating an example of a color chart used in the first embodiment of the invention.

FIG. 2 is a diagram illustrating an example of the color chart 3 used in the first embodiment of the present invention. A chart usable in color designing, such as the ColorChecker DC manufactured by GretagMacbeth, can be used as the color chart 3.

[Color Processing Parameter Editing Unit 2]

Figure 3:
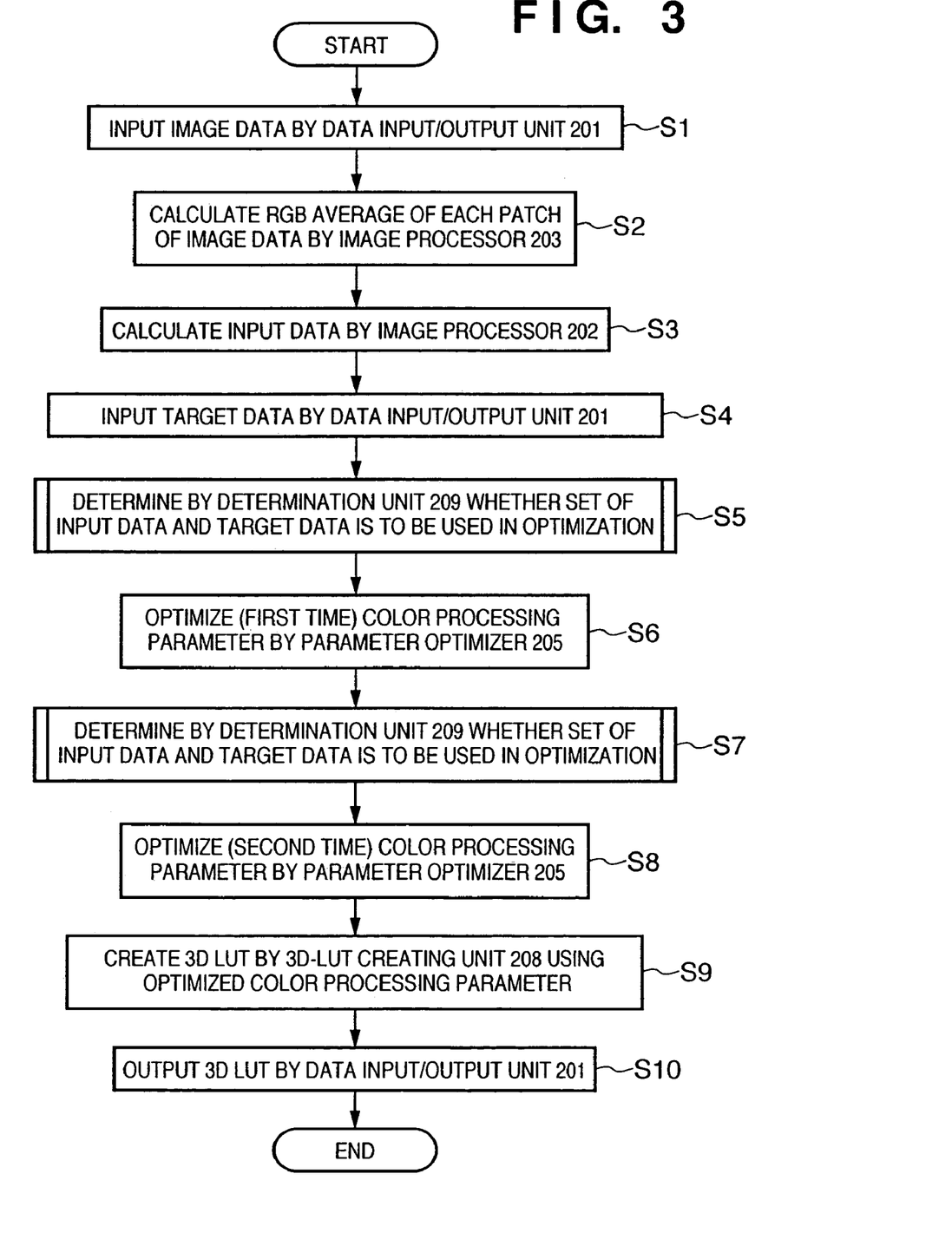
FIG. 3 is a flowchart useful in describing processing for generating a 3D LUT in a color processing parameter editing unit according to the first embodiment of the invention.

FIG. 3 is a flowchart useful in describing processing for generating a 3D LUT in the color processing parameter editing unit 2 according to the first embodiment of the invention. First, the data input/output unit 201 inputs image data, which has been obtained by photographing the color chart 3, from the imaging device 1 (step S1). When the input is made, the image data may be read in directly from the imaging device (digital camera) 1 via a cable or the like or may be read in from a recording medium such as Compact Flash (registered trademark).

Next, the average value calculation unit 203 obtains the RGB average of each patch of the image data read in at step S1 (step S2). The image processor 202 subjects the image data that has entered from the data input/output unit 201 to processing using a color processing parameter that has been stored in the color processing parameter storage unit 206, and calculates the image data (input data) (step S3). The input data is calculated in the image processor 202 by applying color processing to the earlier calculated RGB average using a color processing parameter that has been set in the color processing parameter storage unit 206 beforehand. For example, a 3×3 matrix or 3×9 matrix is conceivable as the color processing parameter. The RGB data after processing is assumed to be sRGB stipulated by IEC 61966-2-1, and the data obtained by transformation to CIELAB adopting the white color point as D65 is adopted as the input data.

After the input data is calculated at step S3, the data input/output unit 201 inputs the target data (step S4). The target data is capable of using CIELAB values obtained by color measurement of each patch per se of the color chart 3 by Spectrolino, etc., manufactured by GretagMacbeth, by way of example. Further, the result obtained when the user makes an adjustment based upon the earlier calculated input data may be used as the target data.

The determination unit 209 determines, one by one, whether sets of input data and target data input earlier are to be used in optimization (step S5). At step S5, the determination unit 209 determines whether each item of target data is within a target color space and selects a group of target data within the target color space. The details of the determination method will be described later with reference to FIG. 4.

Figure 6:
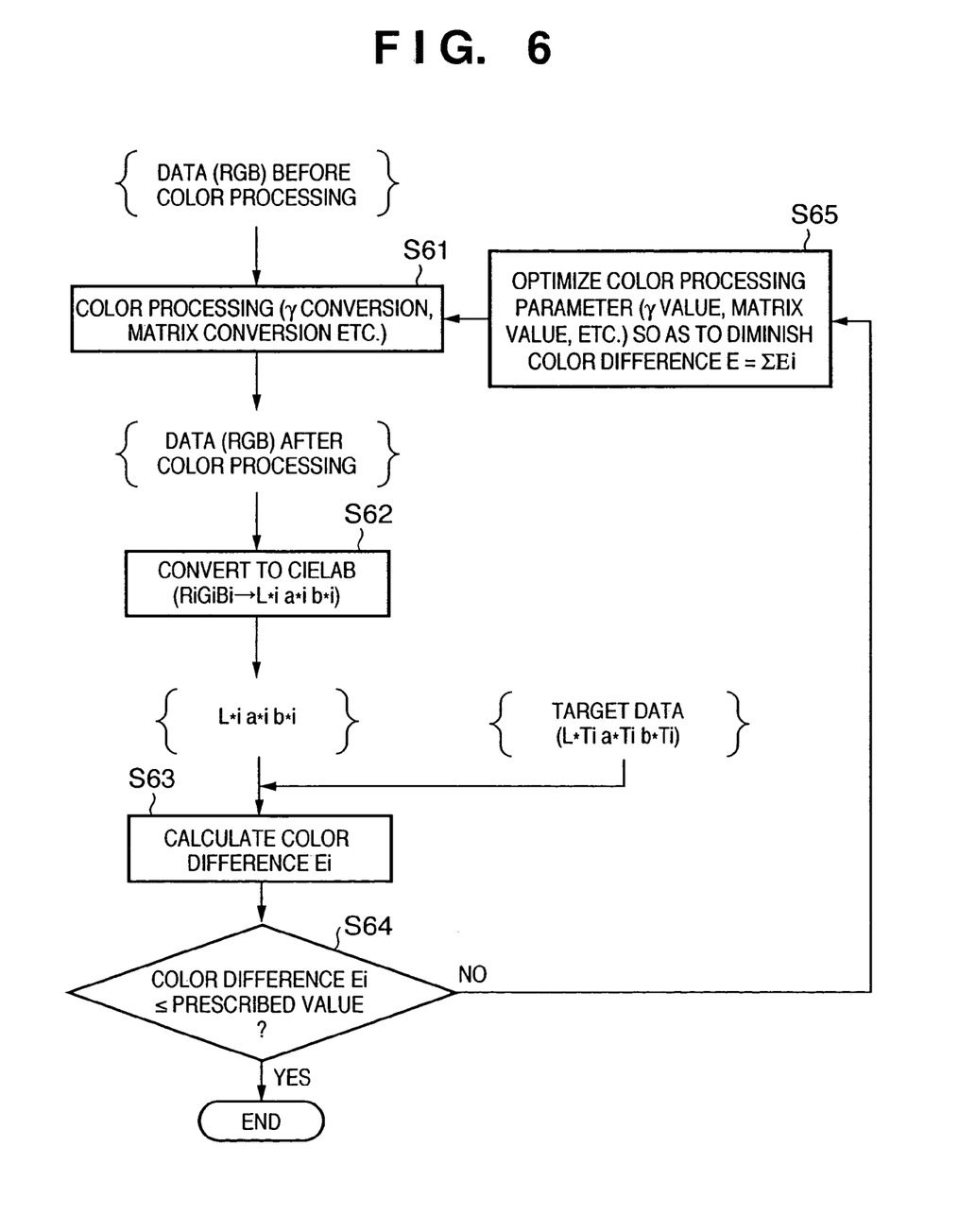
FIG. 6 is a diagram useful in describing the flow of optimization processing executed by a parameter optimizer.

The parameter optimizer 205 optimizes the color processing parameter using the target data within the target color space selected at step S5 and the input data corresponding to this target data (step S6). FIG. 6 illustrates the flow of optimization processing executed by the parameter optimizer 205.

First, a color conversion (e.g., a γ conversion or matrix conversion, etc.) using a calculated color processing parameter is applied to each item of input data [data (RGB) prevailing prior to color processing) (step S61). Next, a CIELAB conversion is applied to the data (RGB) prevailing after color processing, thereby effecting a conversion to $(L^*_i, a^*_i, b^*_i)$ (step S62). A difference Ei between $(L^*_i, a^*_i, b^*_i)$, which is the data obtained by applying, to each item of input data, the color conversion using the calculated color processing parameter and the CIELAB conversion, and target data ($L^*_{Ti}$, $a^*_{Ti}$, $b^*_{Ti}$) is calculated as an evaluation value (step S63).

Let Ei represent an evaluation function of each color patch and let E represent the overall evaluation function. It will suffice to calculate a parameter that minimizes Equation (1).

$$E = \sum_i Ei = \sum_i \sqrt{(L^*_{Ti} - L^*_i)^2 + (a^*_{Ti} - a^*_i)^2 + (b^*_{Ti} - b^*_i)^2} \quad (1)$$

That is, as one example of optimization processing, it will suffice to so arrange it that the color processing parameter is optimized so as to diminish the average of the color difference between the input data and the target data.

Accordingly, it is determined whether the color difference Ei calculated at step S63 is equal to or less than a prescribed value (step S64). If the result of the determination is that the color difference Ei equal to or less than the prescribed value, then optimization processing is terminated. On the other hand, if Ei is greater than the prescribed value ("NO" at step S64), then the color processing parameter (e.g., the γ value or matrix value, etc.) is optimized so as to diminish the average of the color difference between the input data and target data (step S65). Control returns to step S61 and color processing is executed again using the optimized parameter.

Further, a weighting may be set individually for each color patch. With regard to the evaluation function at this time, if we let wi represent the weighting value, then the overall evaluation function E is calculated as indicated by Equation (2).

$$E = \sum_i wiEi = \sum_i wi\sqrt{(L^*_{Ti} - L^*_i)^2 + (a^*_{Ti} - a^*_i)^2 + (b^*_{Ti} - b^*_i)^2} \quad (2)$$

After optimization is performed at step S6, the determination unit 209 determines, one by one, whether sets of input data and target data input earlier are to be used in optimization a second time (step S7). At step S7, in addition to target data within the target color space, target data determined to be outside the color gamut and for which the hue difference between the input data and the target data is less than a prescribed threshold value, and input data corresponding to this target data are selected. The details of the determination method will be described later with reference to FIG. 4.

Optimization of the color processing parameter the second time is performed using the target data and input data corresponding to this target data selected at step S6 (step S8). The details of optimization processing at step S8 is the same as optimization processing the first time at step S6 and need not be described again.

Next, the 3D-LUT creating unit 208 creates a 3D LUT using the color processing parameter optimized earlier (step S9). Illustrated below as one example will be a creating method in a case where it is assumed that the input RGB data of the imaging device (digital camera) 1 is ten bits (0 to 1023) and the number of slices of the 3D LUT is 17.

First, 4913 items of data (R,G,B)=(0,0,0), (0,0,64), (0,0, 128), . . . , (0,0,1023), (0,64,0), (0,64,64), . . . , (0,64,1023), (0,128,0), (0,128,64), . . . , (1023,1023,1023) are input in order. By using the color processing parameter optimized earlier, the $L^*a^*b^*$ value is calculated by the method described at step S3. The calculated 4913 sets of (RGB) minus ($L^*a^*b^*$) are stored in the color processing parameter storage unit 206 as a 3D LUT.

The 3D LUT created is output to the data input/output unit 201 and is uploaded to the imaging device (digital camera) 1 (step S10).

Here examples of equations for conversion from RGB to CIELAB at step S3 are indicated by Equations (3) to (6) below.

$$\left.\begin{array}{l} R_{sRGB} \leq 0.04045 \\ R_{liner} = R_{sRGB}/12.92 \\ R_{sRGB} > 0.04045 \\ R_{liner} = ((R_{sRGB} + 0.055)/1.055)^{2.4} \end{array}\right\} \quad (3)$$

$$\left.\begin{array}{l} G_{sRGB} \leq 0.04045 \\ G_{liner} = G_{sRGB}/12.92 \\ R_{sRGB} > 0.04045 \\ G_{liner} = ((G_{sRGB} + 0.055)/1.055)^{2.4} \end{array}\right\} \quad (4)$$

$$\left.\begin{array}{l} B_{sRGB} \leq 0.04045 \\ B_{liner} = B_{sRGB}/12.92 \\ B_{sRGB} > 0.04045 \\ B_{liner} = ((B_{sRGB} + 0.055)/1.055)^{2.4} \end{array}\right\} \quad (5)$$

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{liner} \\ G_{liner} \\ B_{liner} \end{pmatrix} \times 100.0 \quad (6)$$

Next, examples of equations for conversion from sRGB to CIEXYZ are indicated by Equations (7) to (12) below.

$$\left.\begin{array}{l} X_n = 95.045 \\ Y_n = 100.000 \\ Z_n = 108.892 \end{array}\right\} \quad (7)$$

$$\left.\begin{array}{l} X/X_n > 0.0856 \\ XRate = (X/X_n)^{\frac{1}{3}} \\ X/X_n \leq 0.0856 \\ XRate = 7.787 \times (X/X_n) + 16.0/116.0 \end{array}\right\} \quad (8)$$

$$\left.\begin{array}{l} Y/Y_n > 0.0856 \\ YRate = (Y/Y_n)^{\frac{1}{3}} \\ Y/Y_n \leq 0.0856 \\ YRate = 7.787 \times (Y/Y_n) + 16.0/116.0 \end{array}\right\} \quad (9)$$

$$\left.\begin{array}{l} Z/Z_n > 0.0856 \\ ZRate = (Z/Z_n)^{\frac{1}{3}} \\ Z/Z_n \leq 0.0856 \\ ZRate = 7.787 \times (Z/Z_n) + 16.0/116.0 \end{array}\right\} \quad (10)$$

$$\left.\begin{array}{l} Y/Y_n > 0.0856 \\ L^* = 116.0 \times (Y/Y_n)^{\frac{1}{3}} - 16.0 \\ Y/Y_n \leq 0.0856 \\ L^* = 903.29 \times (Y/Y_n) \end{array}\right\} \quad (11)$$

$$\left.\begin{array}{l} a^* = 500 \times (XRate - YRate) \\ b^* = 200 \times (YRate - ZRate) \end{array}\right\} \quad (12)$$

[Processing by Determination Unit 209]

Figure 4:
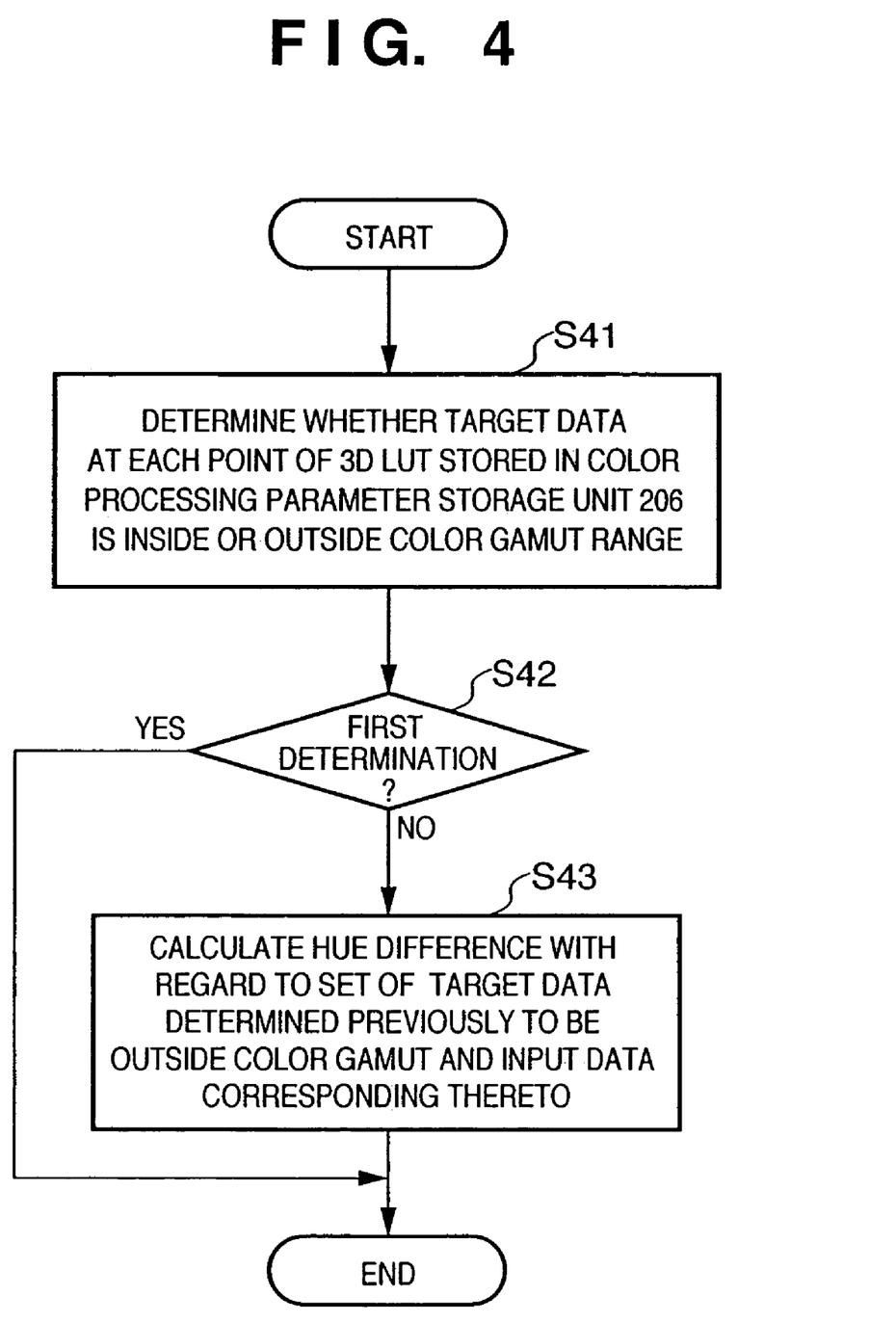
FIG. 4 is a flowchart useful in describing the details of determination processing executed by a determination unit in fifth and seventh steps in FIG. 3.

FIG. 4 is a flowchart useful in describing the details of determination processing executed by the determination unit 209 at steps S5 and S7 in FIG. 3.

In the determination processing, the target data that has been input at step S4 is investigated one at a time and it is determined whether this data is inside or outside the target color space (e.g., sRGB or AdobeRGB, etc.) that is the final target (step S41). The color space that is the final target corresponds to a color space on which the signal that is output from the digital camera depends.

If the color space that is the final target is, e.g., sRGB, then the determination method at step S41 is to convert the target data from the L*a*b* value, which is stipulated by CIELAB, to the sRGB value, which is stipulated by IEC 61966-2-1, with the white color point being D65. Here the conversion from CIELAB to CIEXYZ is indicated by Equations (13) to (17) below.

$$\left.\begin{array}{l} X_n = 95.045 \\ Y_n = 100.000 \\ Z_n = 108.892 \end{array}\right\} \quad (13)$$

$$\left.\begin{array}{l} YRate = (L^* + 16.0)/116.0 \\ XRate = a^*/500.0 + YRate \\ ZRate = -b^*/200.0 + YRate \end{array}\right\} \quad (14)$$

$$\left.\begin{array}{l} XRate^{3.0} > 0.008856 \\ X = X_n \times XRate^{3.0} \\ XRate^{3.0} \le 0.008856 \\ X = (XRate - 16.0/116.0) \times X_n / 7.787 \end{array}\right\} \quad (15)$$

$$\left.\begin{array}{l} YRate^{3.0} > 0.008856 \\ Y = Y_n \times YRate^{3.0} \\ YRate^{3.0} \le 0.008856 \\ Y = (YRate - 16.0/116.0) \times Y_n / 7.787 \end{array}\right\} \quad (16)$$

$$\left.\begin{array}{l} ZRate^{3.0} > 0.008856 \\ Z = Z_n \times ZRate^{3.0} \\ ZRate^{3.0} \le 0.008856 \\ Z = (ZRate - 16.0/116.0) \times Z_n / 7.787 \end{array}\right\} \quad (17)$$

Further, the conversion from CIEXYZ to sRGB is indicated by Equations (18) to (21) below.

$$\begin{pmatrix} R_{liner} \\ G_{Liner} \\ B_{liner} \end{pmatrix} = \begin{pmatrix} 3.2406 & -1.5372 & -0.4986 \\ -0.9689 & 1.8758 & 0.0415 \\ 0.0557 & -0.2040 & 1.0570 \end{pmatrix} \begin{pmatrix} X \\ Y \\ Z \end{pmatrix} / 100.0 \quad (18)$$

$$\left.\begin{array}{l} R_{liner} \le 0.0031308 \\ R_{sRGB} = R_{liner} \times 12.92 \\ R_{liner} > 0.0031308 \\ R_{sRGB} = 1.055 \times R_{liner}^{1.0/2.4} - 0.055 \end{array}\right\} \quad (19)$$

$$\left.\begin{array}{l} G_{liner} \le 0.0031308 \\ G_{sRGB} = G_{liner} \times 12.92 \\ G_{liner} > 0.0031308 \\ G_{sRGB} = 1.055 \times G_{liner}^{1.0/2.4} - 0.055 \end{array}\right\} \quad (20)$$

$$\left.\begin{array}{l} B_{liner} \le 0.0031308 \\ B_{sRGB} = B_{liner} \times 12.92 \\ B_{liner} > 0.0031308 \\ B_{sRGB} = 1.055 \times B_{liner}^{1.0/2.4} - 0.055 \end{array}\right\} \quad (21)$$

If the result of calculation according to Equation (18) is outside the range $0.0 \le R_{liner}, G_{liner}, B_{liner} \le 1.0$, then it is decided that the data is outside the color space range.

Next, the number of determinations made is investigated and it is judged whether this is the first determination (step S42). If the result of the investigation is that this is the first determination (i.e., if this is determination processing that follows step S6; "YES"), then this determination processing is terminated and the target data within the color space range is output to step S7. On the other hand, if this is determination the second time ("NO" at step S42), then control proceeds to step S43.

At step S43, the RGB value of the input data is converted to a Lab value with regard to the set of input data and target data that was determined to be outside the color gamut at step S41. The conversion method is the same as that at step S3.

Figure 5:
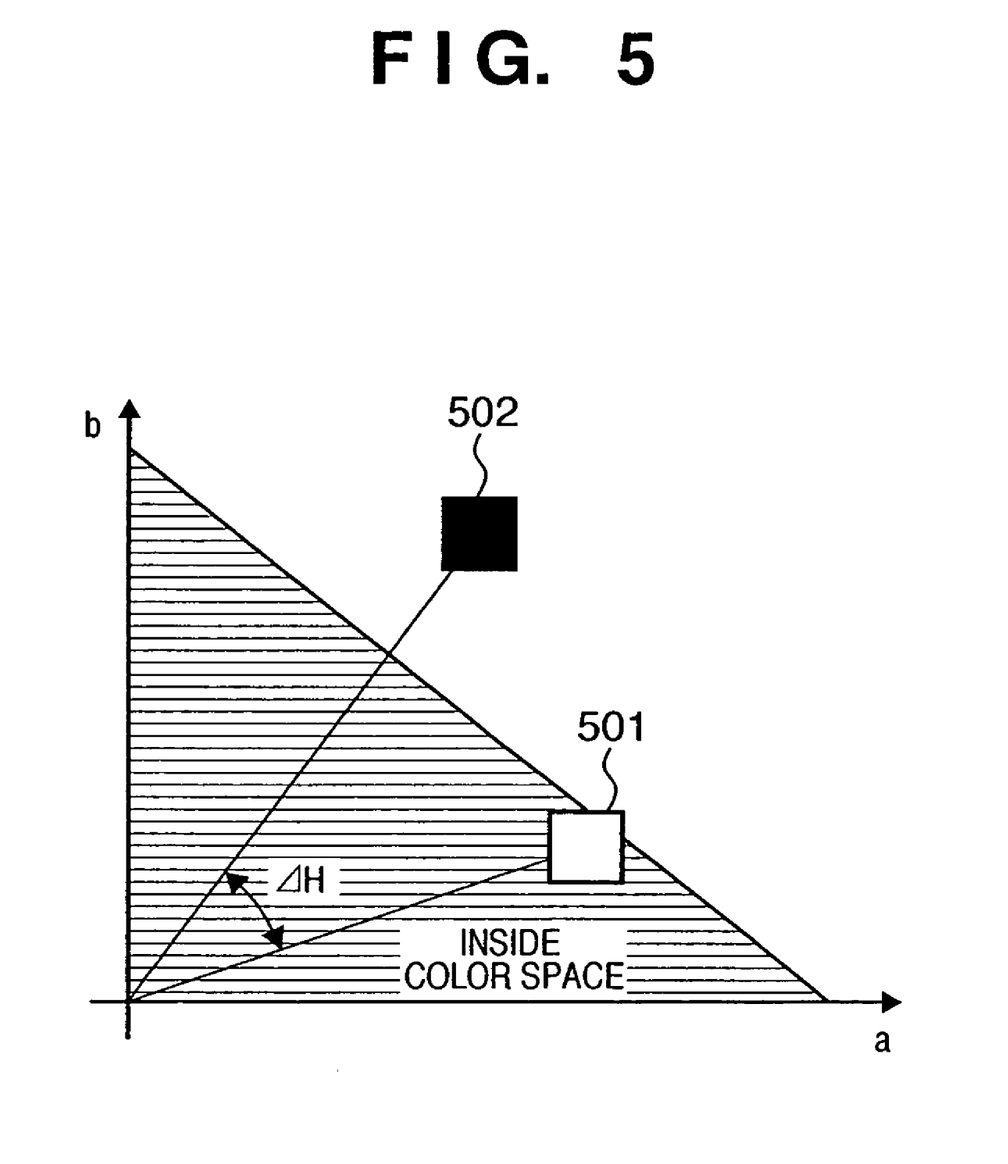
FIG. 5 is a diagram useful in describing a set of certain input data and target data.

FIG. 5 is a diagram useful in describing a set of certain input data and target data. Differences from both a Lab value (Li,ai,bi) 501 of converted input data and a Lab value (Lt,at, bt) 502 of the target data are compared and it is determined whether the relevant set is to be used as the optimization data. The determination method includes comparing ΔL and ΔH, which are indicated in Equation (22) below, with a threshold value and determining not to use the set as optimization data if either is greater than the threshold value. Target data determined at step S41 to be inside the color gamut range and target data determined to be outside the color gamut range and to have a lightness difference and hue difference that are less than prescribed threshold values are output to step S8.

$$\left.\begin{array}{l} \Delta L = |Lt - Li| \\ \Delta C = \sqrt{at^2 + bt^2} - \sqrt{ai^2 + bi^2} \\ \Delta E = \sqrt{(Lt - Li)^2 + (at - ai)^2 + (bt - bi)^2} \\ \Delta H = \sqrt{\Delta E^2 - \Delta L^2 - \Delta C^2} \end{array}\right\} \quad (22)$$

Thus, optimization processing in this embodiment is executed in two stages. The optimization processing of the first stage optimizes the color processing parameter using target data determined to be within a color gamut range and input data that corresponds to this target data. The optimization of the second stage optimizes the color processing parameter using, in addition to target data determined to be within the color reproduction range, target data that has been determined to be outside the color gamut range and that is below a prescribed threshold value, and input data corresponding to this target data.

In accordance with this embodiment, a color processing parameter that has been optimized based upon target data inside a color reproduction range and input data serves as a reference. As a result, it is possible to prevent a major decline in the color reproduction characteristic owing to the influence of target data that is outside the color reproduction range.

Accordingly, even if optimization has been performed fully automatically, a color processing parameter that will not give rise to a color shift (especially a hue shift) in final image data after color conversion, and a 3D LUT generated by this color processing parameter, can be set in ideal fashion.

Other Embodiments

In the first embodiment described above, the invention is constituted by a digital camera and a color processing parameter editing unit, and an exchange of data is performed by directly connecting the digital camera and color processing parameter editing unit using a cable or the like. However, the exchange of data may be performed using a recording medium such as a Compact Flash (registered trademark).

Further, in the first embodiment described above, the equation indicated by Equation (1) is used as the evaluation function. It goes without saying, however, that ΔE94 indicated by Equation (23) below may be used.

$$Ei = \Delta E94 = \sqrt{\Delta L^{*2} + \left(\frac{\Delta C^*}{1 + 0.045C1}\right)^2 + \left(\frac{\Delta H^*}{1 + 0.015C1}\right)^2} \quad (23)$$

where $$\begin{cases} \Delta L^* = L^*_{Ti} - L^*_i \\ \Delta C^* = \sqrt{a^{*2}_{Ti} + b^{*2}_{Ti}} - \sqrt{a^{*2}_i + b^{*2}_i} \\ \Delta H = \sqrt{\Delta E^2 - \Delta L^{*2} - \Delta C^{*2}} \\ C1 = \sqrt{a^{*2}_{Ti} + b^{*2}_{Ti}} \end{cases}$$

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

In accordance with the present invention, highly precise color reproduction can be achieved with little color shift in a final image after color conversion even if optimization is performed fully automatically.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-314720 filed on Oct. 28, 2004, which is hereby incorporated by reference herein.

What is claimed is:

1. An image processing method for optimizing a color processing parameter used in color processing, the method comprising:

using a processor to perform:

an acquisition step, of acquiring data by sensing a color chart in which a plurality of color patches are included;

a converting step, of converting acquired data of each color patch, acquired in said acquisition step, into converted color data based on the color processing parameter;

a target color data input step, of inputting target color data corresponding to the color data of each color patch; and an optimizing step, of optimizing the color processing parameter so as to diminish a color difference between the converted color data corresponding to the target color data and the target color data, wherein said optimizing step includes:

a first optimizing sub-step, of optimizing the color processing parameter based on first target color data, of the target color data, being within a prescribed color gamut and first converted color data, of the converted color data, corresponding to the first target color data; and a second optimizing sub-step, of optimizing the color processing parameter based on the first target color data and the first converted color data, and second target color data, of the target color data, which is out of the prescribed color gamut, and second converted color data, of the converted color data, corresponding to the second target color data, wherein hue difference between the second target color data and the second converted color data corresponding to the second target color data is smaller than a predetermined value.

2. The method according to claim 1, wherein said optimizing step includes optimizing the color processing parameter so as to diminish an average of the color difference.

3. The method according to claim 1, further comprising a 3D LUT creating step of creating a 3D LUT using the color processing parameter that has been optimized in said optimizing step.

4. The method according to claim 3, further comprising an upload step of uploading the 3D LUT, which has been created in said 3D LUT creating step.

5. The method according to claim 1, wherein said optimizing step also includes optimizing the color processing parameter so as to diminish a total of a difference obtained by using a weighting value corresponding to each color patch.

6. An image processing apparatus for optimizing a color processing parameter used in color processing of an image, comprising:
  an acquisition unit, adapted to acquire data by sensing a color chart in which a plurality of color patches are included;
  a converting unit, adapted to convert acquired data of each color patch, acquired by said acquisition unit, into converted color data based on the color processing parameter;
  a target color data input unit, adapted to input target color data corresponding to the color data of each color patch; and
  an optimizing unit, adapted to optimize the color processing parameter so as to diminish a color difference between the converted color data corresponding to the target color data and the target color data,
  wherein said optimizing unit includes:
  a first optimizing unit adapted to optimize the color processing parameter based on first target color data, of the target color data, being within a prescribed color gamut and first converted color data, of the converted color data, corresponding to the first target color data; and
  a second optimizing unit adapted to optimize the color processing parameter based on the first target color data and the first converted color data, and second target color data, of the target color data, which is out of the prescribed color gamut, and second converted color data, of the converted color data, corresponding to the second target color data, wherein hue difference between the second target color data and the second converted color data corresponding to the second target color data is smaller than a predetermined value.

7. A program, stored in executable form in a computer-readable storage medium, for causing a computer, which optimizes a color processing parameter used in color processing of an image, to execute the following procedures:
  an acquisition step, of acquiring data by sensing a color chart in which a plurality of color patches are included;
  a converting step, of converting acquired data of each color patch, acquired in said acquisition step, into converted color data based on the color processing parameter;
  a target color data input step, of inputting target color data corresponding to the color data of each color patch; and
  an optimizing step, of optimizing the color processing parameter so as to diminish a color difference between the converted color data corresponding to the target color data and the target color data,
  wherein said optimizing step includes:
  a first optimizing sub-step, of optimizing the color processing parameter based on first target color data, of the target color data, being within a prescribed color gamut and first converted color data, of the converted color data, corresponding to the first target color data; and
  a second optimizing sub-step, of optimizing the color processing parameter based on the first target color data and the first converted color data, and second target color data, of the target color data, which is out of the prescribed color gamut, and second converted color data, of the converted color data, corresponding to the second target color data, wherein hue difference between the second target color data and the second converted color data corresponding to the second target color data is smaller than a predetermined value.

8. A computer-readable storage medium storing the program set forth in claim 7.

* * * * *